(12) United States Patent
Wang et al.

(10) Patent No.: US 8,195,245 B2
(45) Date of Patent: Jun. 5, 2012

(54) METHOD AND USER INTERFACE APPARATUS FOR MANAGING FUNCTIONS OF WIRELESS COMMUNICATION COMPONENTS

(75) Inventors: Bo-Chiang Wang, Taipei (TW); Yi-Hsi Wu, Taipei (TW); Ching-Chih Chang, Taipei (TW); Yu-Ting Hsu, Taipei (TW); Hong-Tien Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 409 days.

(21) Appl. No.: 12/501,494

(22) Filed: Jul. 13, 2009

(65) Prior Publication Data

US 2010/0285785 A1    Nov. 11, 2010

(30) Foreign Application Priority Data

May 11, 2009    (TW) ................................ 98115528 A

(51) Int. Cl.
*H04M 1/00* (2006.01)

(52) U.S. Cl. ...................... 455/566; 455/418; 455/552.1; 455/550.1; 345/594; 345/619

(58) Field of Classification Search .................. 455/566, 455/550.1, 552.1, 553.1, 422.1; 715/700, 715/810; 345/594
See application file for complete search history.

(56) References Cited

U.S. PATENT DOCUMENTS

| | | | |
|---|---|---|---|
| 7,668,508 B2 * | 2/2010 | Zheng et al. | 455/41.2 |
| 7,783,322 B2 * | 8/2010 | Pi et al. | 455/552.1 |
| 2007/0067734 A1 | 3/2007 | Cunningham et al. | |
| 2008/0146190 A1 * | 6/2008 | Kister | 455/405 |
| 2009/0163195 A1 * | 6/2009 | Kim et al. | 455/422.1 |
| 2009/0280790 A1 * | 11/2009 | Ahn et al. | 455/418 |
| 2010/0099393 A1 * | 4/2010 | Brisebois et al. | 455/418 |
| 2010/0331040 A1 * | 12/2010 | Kokubu | 455/552.1 |

* cited by examiner

*Primary Examiner* — Kamran Afshar
*Assistant Examiner* — Kathy Wang-Hurst
(74) *Attorney, Agent, or Firm* — Jianq Chyun IP Office

(57) ABSTRACT

A method and a user interface apparatus for managing functions of wireless communication components are provided. The present method displays a plurality of status bars respectively representing the wireless communication components on a screen of a communication device and arranges the status bars to form a management interface, wherein each of the status bars corresponds to a status switching region and displays a plurality of function icons of usable functions of the corresponding wireless communication component. Then, the communication device detects a selection operation from a user. When the selection operation is selecting the status switching region, an activation status of the wireless communication component corresponding to the selected status switching region is switched. When the selection operation is selecting the function icon, a function corresponding to the selected function icon is executed. Accordingly, the present invention provides a convenient way for the user to manage the wireless communication components.

24 Claims, 3 Drawing Sheets

METHOD AND USER INTERFACE APPARATUS FOR MANAGING FUNCTIONS OF WIRELESS COMMUNICATION COMPONENTS

CROSS-REFERENCE TO RELATED APPLICATION

This application claims the priority benefit of Taiwan application serial no. 98115528, filed on May 11, 2009. The entirety of the above-mentioned patent application is hereby incorporated by reference herein and made a part of specification.

BACKGROUND OF THE INVENTION

1. Field of the Invention

The present invention relates to a management method and a user interface apparatus. More particularly, the present invention relates to a method and a user interface apparatus for managing functions of wireless communication components.

2. Description of Related Art

With booming development of communication technologies, wireless communications can be implemented among the present communication devices. The wireless communication techniques are diversified, and with a support of basic techniques such as orthogonal frequency-division multiplexing (OFDM) and multiple input and multiple output (MIMO), the wireless local area network (LAN) techniques such as bluetooth, wireless fidelity (Wi-Fi), and worldwide interoperability for microwave access (WiMAX) are quickly developed. Regarding a field of mobile communications, the second generation mobile communication technology specification (2G) has been developed to current 3G or 3.5G, and is gradually developed towards 4G. Moreover, by combining the wireless communication techniques with a satellite technology, a global positioning system (GPS) can provide users with information of accurate position, speed and time.

Based on the wireless communication techniques, communications among people are no longer limited by time and space, and a functionality of the communication device is improved by various functions thereof. From the conventional wireless phone call function to the latest wireless Internet connection function, bluetooth transmission function or satellite positioning function, multiple wireless functions are integrated into the communication device currently available in the market, so as to provide people with diversified choices.

Though a quantity of the wireless communication components equipped to the communication device is gradually increased, a conventional menu operation of the communication device is still maintained. However, each time when the user wants to use a certain function, the user has to find a category of such function from a main menu of the communication device, and then gradually finds an item of such function through menu layers step by step, and finally selects the item to execute the desired function. Therefore, such operation procedure is complicate and inconvenient.

Moreover, while a function is selected, if the wireless communication component required for executing such function is not activated, or is not available (for example, no wireless signal is received within an indoor environment), the user has to additionally find a corresponding item of the wireless communication component from the menu to activate the wireless communication component, or has to find an alternative wireless communication component to execute the desired function, which may bring a lot of trouble to the user. Therefore, a more intuitive method is required to managing the functions of the wireless communication components, so as to improve a utilization convenience of the communication device.

SUMMARY OF THE INVENTION

Accordingly, the present invention is directed to a method for managing functions of wireless communication components, by displaying a status bar corresponding to each of the wireless communication components, a user can switch on/off the wireless communication components or select a required function.

The present invention is directed to a user interface apparatus for managing functions of wireless communication components, which can select and arrange the functions according to the characteristics of the wireless communication components, so that a user can manage the functions of the wireless communication components.

The present invention provides a method for managing functions of wireless communication components, which is adapted to manage functions of a plurality of the wireless communication components in a communication device. The method comprises following steps. First, a plurality of status bars representing the wireless communication components are respectively displayed on a screen of the communication device, and the status bars are arranged to form a management interface, wherein each of the status bars corresponds to a status switching region, and displays function icons of the functions of the corresponding wireless communication component. Next, the communication device detects a selection operation from a user. When the selection operation is selecting one of the status switching regions, an activation status of the wireless communication component corresponding to the selected status switching region is switched, and then a search for the functions of the activated wireless communication components is performed according to the activation status of each of the wireless communication components. Next, the wireless communication component that each of the searched functions corresponds to is determined according to a priority order of the activated wireless communication components, and the function icons of the functions are displayed in the status bar of the corresponding wireless communication component. In addition, when the selection operation is selecting one of the function icons, the function corresponding to the selected function icon is executed.

In an embodiment of the present invention, before the step of respectively displaying the status bar representing each of the wireless communication components, the method further comprises detecting the activation status of each of the wireless communication components when an activation operation performed on the management interface by the user is received.

In an embodiment of the present invention, the step of respectively displaying the status bar representing each of the wireless communication components comprises indicating the activation status of each of the wireless communication components in the corresponding status switching region or the corresponding status bar.

In an embodiment of the present invention, the step of respectively displaying the status bar representing each of the wireless communication components comprises searching for the functions of the activated wireless communication components according to the activation status of each of the wireless communication components, and displaying the function icons of the searched functions in the status bars of the corresponding wireless communication components.

In an embodiment of the present invention, the step of respectively displaying the status bar representing each of the wireless communication components further comprises determining the wireless communication component that each of the searched functions corresponds to according to the priority order of the activated wireless communication components, and displaying the function icons of the functions in the status bar of the corresponding wireless communication component. Wherein, the priority order is determined according to a communication charge rate, a communication quality or a transmission rate of each of the wireless communication components.

In an embodiment of the present invention, the step of respectively displaying the status bar representing each of the wireless communication components further comprises determining whether two or more wireless communication components required for executing one of the functions are activated, and displaying the function icon of the function in the status bar of one of the wireless communication components only when the required wireless communication components are all activated.

In an embodiment of the present invention, the step of respectively displaying the status bar representing each of the wireless communication components comprises hiding or darkening the function icons of the functions of the wireless communication components that are not activated.

In an embodiment of the present invention, the step of respectively displaying the status bar representing each of the wireless communication components comprises sequentially arranging the function icons of the functions in the corresponding status bar according to a use frequency of the functions of each of the wireless communication components.

In an embodiment of the present invention, the step of respectively displaying the status bar representing each of the wireless communication components comprises displaying a signal strength of each of the wireless communication components in the corresponding status bar.

The present invention provides a user interface apparatus for managing functions of wireless communication components, which is adapted to a communication device comprising a plurality of the wireless communication components. The user interface apparatus comprises an input unit, a status bar module, a status switching module and a function executing module. The input unit allows a user to input a selection operation for the communication device. The status bar module respectively displays a status bar representing each of the wireless communication components, and arranges the status bars to form a management interface. The status switching module corresponds to a status switching region of each of the wireless communication components, and displays the corresponding status switching region in the status bar of each of the wireless communication components. When the selection operation is selecting one of the status switching regions, the status switching module switches an activation status of the wireless communication component corresponding to the selected status switching region. The function executing module displays function icons of functions in the status bar of each of the wireless communication components. When the selection operation is selecting one of the function icons, the function executing module executes the function corresponding to the selected function icon. Wherein, when the status switching module switches the activation status of the wireless communication component corresponding to the selected status switching region, the function executing module searches for the functions of the wireless communication component according to the activation status of each of the wireless communication components, determines the wireless communication component that each of the searched functions corresponds to according to a priority order of the activated wireless communication components, and displays the function icons of the functions in the status bar of the corresponding wireless communication component.

In an embodiment of the present invention, the status switching module indicates the activation status of each of the wireless communication components in the corresponding status switching region or the corresponding status bar.

In an embodiment of the present invention, the function executing module searches for the functions of each of the wireless communication components according to the activation status of each of the wireless communication components, and displays the function icons of the functions on the corresponding status bar.

In an embodiment of the present invention, the function executing module determines the wireless communication component that each of the searched functions corresponds to according to a priority order of the activated wireless communication components, and displays the function icons of the functions in the status bar of the corresponding wireless communication component. Wherein, the priority order is determined according to a communication charge rate, a communication quality or a transmission rate of each of the wireless communication components.

In an embodiment of the present invention, the function executing module further determines whether two or more wireless communication components required for executing one of the functions are activated, and displays the function icon of the function in the status bar of one of the wireless communication components only when the required wireless communication components are all activated.

In an embodiment of the present invention, the function executing module further hides or darkens the function icons of the functions of the wireless communication components that are not activated.

In an embodiment of the present invention, the function executing module further sequentially arranges the function icons of the functions in the corresponding status bar according to a use frequency of the functions of each of the wireless communication components.

In an embodiment of the present invention, the user interface apparatus further comprises a signal strength display module, which is used for displaying a signal strength of each of the wireless communication components in the corresponding status bar.

In an embodiment of the present invention, the wireless communication components are a global positioning system (GPS) component, a global system for mobile communication (GSM) component, a personal handy-phone system (PHS) component, a code division multiple access (CDMA) component, a wireless fidelity (Wi-Fi) system component or a bluetooth component.

In an embodiment of the present invention, the status switching region is a screen button or an icon displayed in the corresponding status bar, or a hardware button equipped on the communication device.

In an embodiment of the present invention, the input unit includes one of a touch screen, a touch panel, a keyboard and a mouse.

According to the method and the user interface apparatus for managing the functions of the wireless communication components, the status switching region and the function icons of the functions are displayed in the status bar of each of the corresponding wireless communication components, so that the user can select the status switching region to switch the activation status of the wireless communication component, or can select the function icon to execute the required function.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Regarding a menu or an operation interface of a general device, device functions are generally categorised according to the attributes thereof, so that a user can select a function item from the menu to execute a required function. Comparatively, in addition to the original menu structure, the present invention further establishes a management interface which categorises the device functions according to the devices, wherein the management interface not only lists all the wireless communication components of the device, but also respectively displays functions of the wireless communication components. Therefore, according to the management interface of the present invention, not only the user can clearly know an operation state of each of the wireless communication components of the device from the same frame, but also can quickly select a required function. According to the above concept, embodiments are provided below for describing the method and the user interface apparatus for managing the functions of the wireless communication components.

Figure 1:
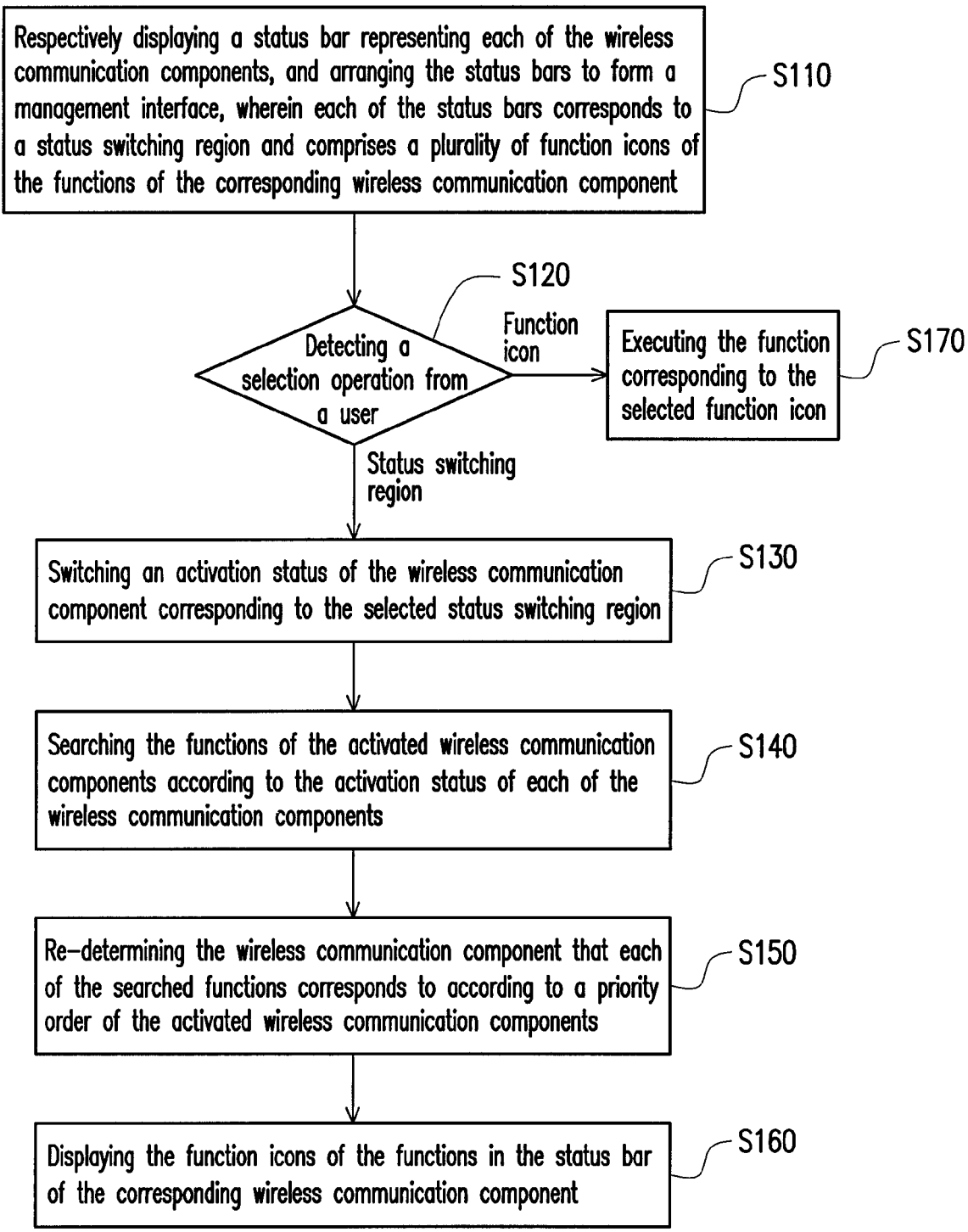
FIG. 1 is a flowchart illustrating a method for managing functions of wireless communication components according to an embodiment of the present invention.

FIG. 1 is a flowchart illustrating a method for managing functions of wireless communication components according to an embodiment of the present invention. Referring to FIG. 1, the method of the present invention is adapted to manage a plurality of functions of a communication device. The functions are categorised according to a plurality of the wireless communication components configured in the communication device, and are displayed on a screen of the communication device. Wherein, the communication device is a portable electronic device such as a mobile phone, a personal digital assistant (PDA) mobile phone or a notebook computer, and the wireless communication component is, for example, a global positioning system (GPS) component, a global system for mobile communication (GSM) component, a personal handy-phone system (PHS) component, a code division multiple access (CDMA) component, a wireless fidelity (Wi-Fi) system component or a bluetooth component, which are used for executing different kinds of wireless functions of the communication device. Detail steps of the method are described as follows.

First, the communication device displays a status bar representing each of the wireless communication components on a screen of the communication device, and arranges the status bars of all the wireless communication components to form a management interface (step S110). Wherein, each of the status bars corresponds to a status switching region (or an icon) and includes a plurality of function icons of the functions of the corresponding wireless communication component. In detail, an activation button capable of calling/initiating the management interface is, for example, configured in the original user interface of the communication device. When the communication device receives an activation operation performed by the user to initiate the management interface (i.e. the user presses the activation button), the communication device automatically detects an activation status of each of the wireless communication components and activates the management interface to display a detection result.

The management interface configures an independent status bar for each of the wireless communication components to represent a current state of each of the wireless communication components. In an embodiment, besides displaying a name and a signal strength of the wireless communication component, the status bar also displays the status switching region and the function icons of the functions of the wireless communication component. Wherein, the activation status of each of the wireless communication components is further indicated on the corresponding status switching region. For example, when the wireless communication component is activated, the status switching region is lit up, and when the wireless communication component is deactivated, the status switching region is darkened, so that the user can know a current operation state of the wireless communication component.

It should be noted herein that in another embodiment, the status switching region can be a hardware button equipped on the communication device, and each of the status switching region corresponds to a wireless communication component, and can be used for switching the activation status of the wireless communication component.

On the other hand, before the communication device displays the function icons, the communication device searches for the functions capable of being used by the activated and normally-operated wireless communication components from the wireless functions of the communication device according to the activation status of each of the wireless communication components, and displays the function icons of the functions in the status bars. For example, when the GPS component is activated, a function icon of a satellite positioning function can be displayed in a GPS status bar; when the GSM component is activated, a function icon of a phone call function can be displayed in a GSM status bar; when the Wi-Fi component is activated, a function icon of an Internet function can be displayed in a Wi-Fi status bar; and when the bluetooth component is activated, a function icon of a bluetooth device connection function can be displayed in a bluetooth status bar.

Figure 2:
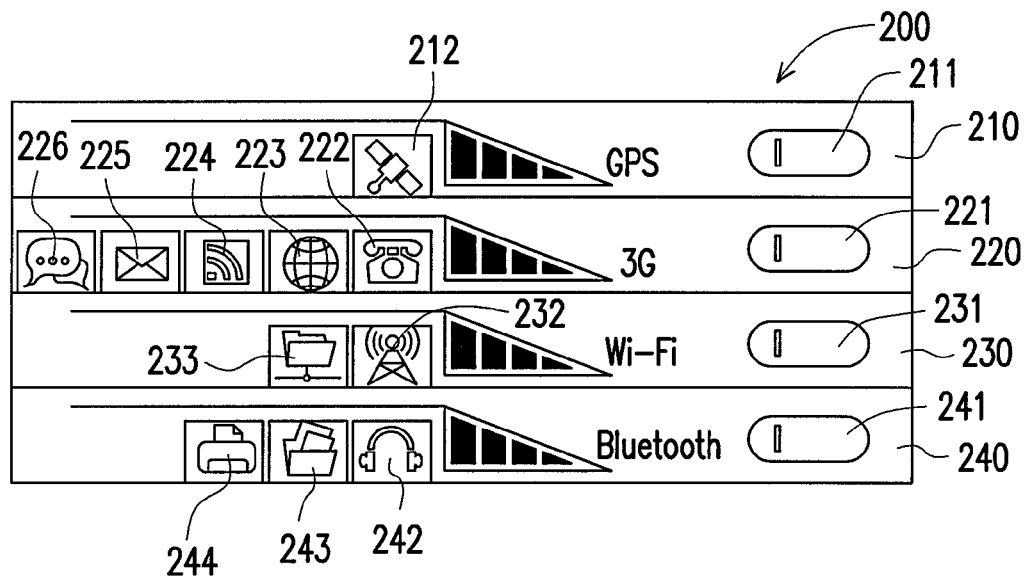
FIG. 2 is a schematic diagram illustrating a management interface of functions of wireless communication components according to an embodiment of the present invention.

For example, FIG. 2 is a schematic diagram illustrating a management interface of the functions of the wireless communication components according to an embodiment of the present invention. Referring to FIG. 2, the management interface 200 includes a GPS status bar 210, a 3G status bar 220, a Wi-Fi status bar 230 and a bluetooth status bar 240 respectively corresponding to the GPS component, the 3G component, the Wi-Fi component and the bluetooth component of the communication device.

Wherein, besides the names (for example, GPS, 3G, Wi-Fi or bluetooth) and the signal strengths of the wireless communication components are displayed on the corresponding status bar, the status switching regions (for example, the icons 211, 221, 231 or 241) are also configured at the right sides of the status bars, and the status switching regions can be brightened or darkened when the wireless communication components are activated or deactivated, so as to indicate the current operation states of the wireless communication components.

Moreover, the function icons of the functions of the wireless communication component are displayed at the left side of each of the status bar, for example, a satellite positioning function icon 212 of the GPS component; a phone call function icon 222, an Internet function icon 223, a really simple syndication (RSS) reader function icon 224, an e-mail function icon 225, and an instant messaging software function icon 226 of the 3G component; a wireless network shareware function icon 232 and a network data folder function icon 233 of the Wi-Fi component; and a bluetooth earphone function icon 242, a bluetooth transmission function icon 243, and a bluetooth printing function icon 244 of the bluetooth component.

It should be noted herein that each of the wireless communication components of the communication device has its own usage, and most of the functions supported by the wireless communication components are different. However, in some exceptional cases, different wireless communication components may support similar functions. In this case, the wireless communication component that each of the searched functions corresponds to/is best supported by is determined according to a priority order of the activated wireless communication components. Then, the function icons of the searched functions are displayed on the status bar of the corresponding wireless communication component. Wherein, the priority order is determined according to a communication charge rate, a communication quality, a transmission rate, or other factors of each of the wireless communication components, which is not limited by the present invention.

For example, in the management interface 200 of FIG. 2, the phone call function icon 222, the Internet function icon 223, the RSS reader function icon 224, the e-mail function icon 225, and the instant messaging software function icon 226 are all displayed in the status bar 220 of the 3G component. However, in practice, the Internet function, the RSS reader function, the e-mail function and the message function of the communication device can be implemented by either of the 3G component and the Wi-Fi component. However, since the signal strength of the 3G component is relatively high, and a communication charge rate of the 3G component is relatively low (which is depended on an actual circumstance, and is only used as an example herein), the communication device arranges the function icons of the functions in the status bar of the 3G component in priority, so as to provide a better solution for the user.

Moreover, in some exceptional cases, some specific functions are probably implemented by two or more wireless communication components. Accordingly, when searching for the functions of each of the wireless communication components, the communication device further determines whether the wireless communication components required for executing the function are activated, and the function icon of the function is displayed only when the required wireless communication components are all activated. Moreover, such function icon can be displayed in the status bar of a representative wireless communication component of the aforementioned wireless communication components only. Conversely, as long as one of the wireless communication components is not activated, the function icon of the function is not displayed. For example, to inquire an electronic map of a current location from the Internet, the GPS component and the Wi-Fi component are required to be simultaneously activated, so as to obtain the current location through the GPS component and inquire the electronic map of the positioned location from the Internet.

After the communication device displays the management interface, the user can select the status switching regions and the function icons in each of the status bars of the management interface according to an actual demand, so as to control the communication device to execute a corresponding function. Meanwhile, the communication device detects a selection operation from a user (step S120). The selection operation is, for example, an operation generated when the user presses a touch area or an icon displayed on the device screen, or presses a hardware button equipped on the communication device, which is not limited by the present invention.

When the selection operation detected by the communication device is selecting a certain status switching region, the activation status of the wireless communication component corresponding to the selected status switching region is switched (step S130). In brief, if the wireless communication component is originally activated, after the communication device receives the selection operation of the status switching region corresponding to such wireless communication component, the wireless communication component is deactivated. Conversely, if the wireless communication; component is originally deactivated, after the communication device receives the selection operation of the status switching region corresponding to such wireless communication component, the wireless communication component is activated.

It should be noted herein that after the activation status of the wireless communication component is switched, the function icons displayed in the status bars of the wireless communication components may be changed due to the selection operation of the user. Namely, when the user activates or deactivates a certain wireless communication component, the communication device can search for the functions of the rest activated wireless communication components according to the activation status of each of the wireless communication components (step S140), re-determine the wireless communication component that each of the searched functions corresponds to according to a current priority order of the activated wireless communication components (step S150), and then display the function icons of the functions in the status bar of the corresponding wireless communication component (step S160).

On the other hand, when the selection operation detected by the communication device is selecting a certain function icon, a function corresponding to the selected function icon is executed (S170). In detail, when the communication device displays the function icons in the status bars of the wireless communication components, it represents that the functions corresponding to the function icons can be normally executed, and then the user can freely select one of the function icons to execute the required function. It should be noted herein that after the user selects one of the function icons, the communication device can further record a number of times that the user uses such function and correspondingly adjust an order of the function icon of such function in the status bar, so that the function icon of the most commonly used function can be arranged at the most front-end of the status bar to facilitate being browsed and selected by the user.

Figure 3:
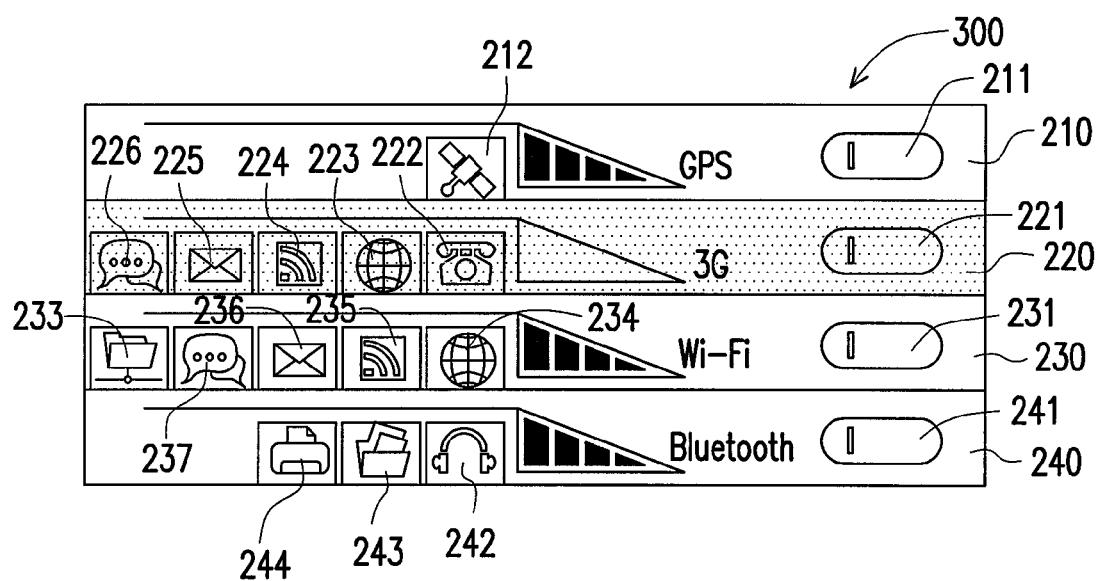
FIG. 3 is a schematic diagram illustrating a management interface of functions of wireless communication components according to an embodiment of the present invention.

For example, FIG. 3 is a schematic diagram illustrating a management interface of the functions of the wireless communication components according to an embodiment of the present invention. Referring to FIG. 2 and FIG. 3, the management interface 300 of the present embodiment and the management interface 200 of FIG. 2 are management interface used in the same communication device. The management interface 300 also includes the GPS status bar 210, the 3G status bar 220, the Wi-Fi status bar 230 and the bluetooth status bar 240 corresponding to the GPS component, the 3G component, the Wi-Fi component and the bluetooth component, respectively.

Particularly, when the user presses the status switching region 222 in the 3G status bar 220 of FIG. 2, the communication device deactivates the 3G component, and darkens the 3G status bar 220 (as shown in FIG. 3) for representing that the 3G component is deactivated, and the corresponding functions of the 3G component cannot be used. Wherein, when the 3G component is deactivated, the communication device can, for example, hide or darken the function icons of the functions of the 3G component for representing that these functions cannot be used. In the present embodiment, the 3G status bar 220 displays the function icons (i.e. the phone call function icon 222, the Internet function icon 223, the RSS reader function icon 224, the e-mail function icon 225 and the instant messaging software function icon 226) of the functions of the 3G component by a darkening approach for representing that the functions corresponding to the these function icons cannot be executed by the 3G component.

However, an Internet function icon 234, an RSS reader function icon 235, an e-mail function icon 236 and an instant messaging software function icon 237 are additionally added to the Wi-Fi status bar 230 of the management interface 300 compared to that of the management interface 200. The functions corresponding to these function icons are originally assigned to the 3G component, though in case that the 3G component is deactivated, the communication device reassigns the functions to the Wi-Fi component. Therefore, the user can still select these function icons to execute the required functions.

Based on the aforementioned method for managing the functions of the wireless communication components, the present invention also provides a corresponding user interface apparatus. The user interface apparatus can be configured to the communication device having a plurality of the wireless communication components to implement the aforementioned management method. An embodiment is provided below for detail descriptions.

Figure 4:
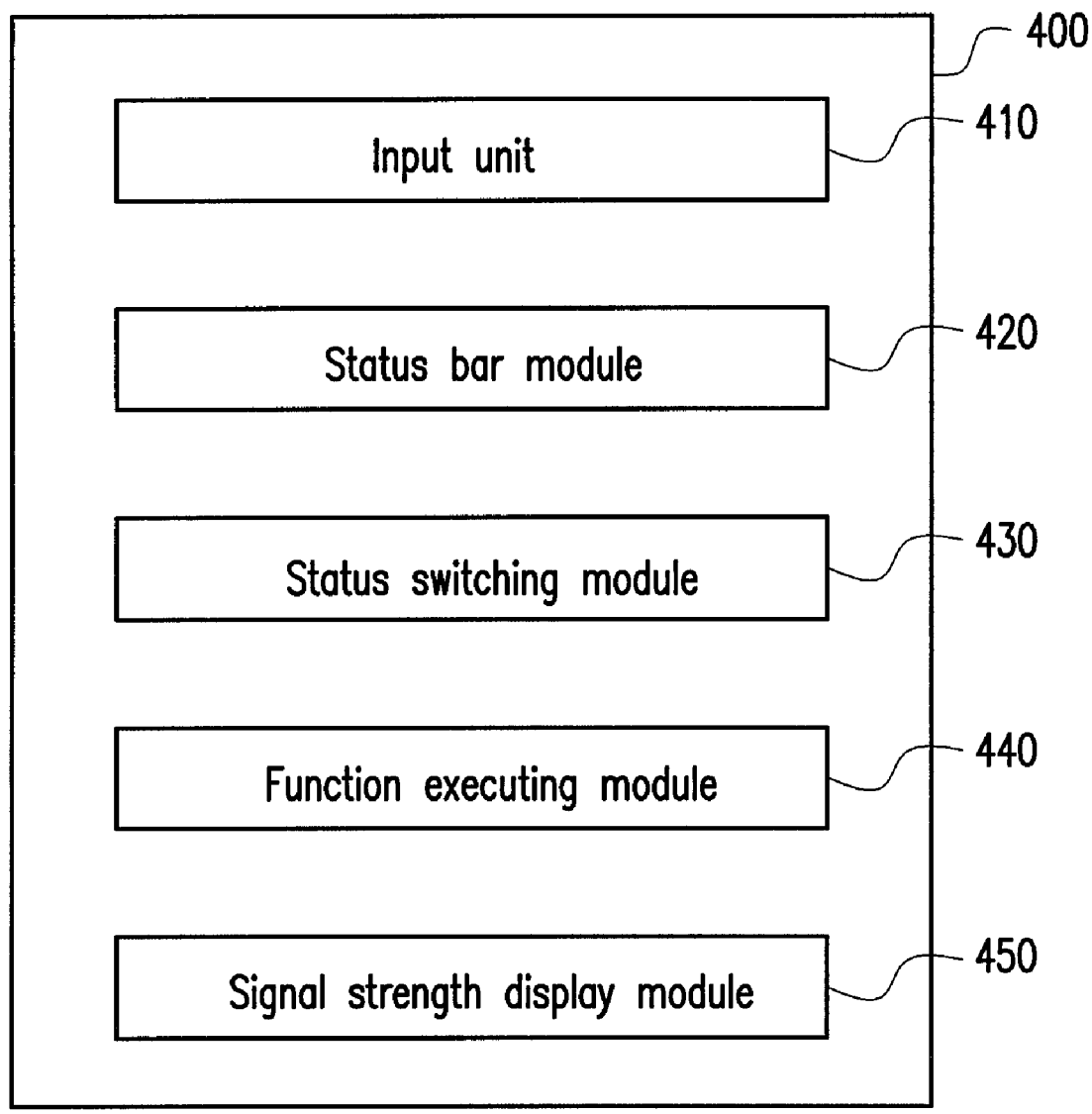
FIG. 4 is a block diagram illustrating a user interface apparatus for managing functions of wireless communication components according to an embodiment of the present invention.

FIG. 4 is a block diagram illustrating a user interface apparatus for managing the functions of the wireless communication components according to an embodiment of the present invention. Referring to FIG. 4, the user interface apparatus 400 of the present embodiment includes an input unit 410, a status bar module 420, a status switching module 430, a function executing module 440 and a signal strength display module 450. Wherein, the user interface apparatus 400 is, for example, configured to a communication device (not shown) such as a mobile phone, a personal digital assistant (PDA) mobile phone or a notebook computer for managing the functions of the wireless communication components configured in the communication device.

The input unit 410 is, for example, a touch screen, a touch panel, a keyboard or a mouse, etc., which allows the user to input a selection operation for the communication device, so that other modules can accordingly execute the selected function.

The status bar module 420 respectively displays the status bars representing the wireless communication components on the screen of the communication device, and arranges the status bars to form the management interface. Wherein, the status bar module 420 can, for example, indicate the name or the icon of the corresponding wireless communication components in each of the status bars.

The status switching module 430 corresponds to the status switching regions of the wireless communication components, and displays the status switching region or the icon in the corresponding status bar according to the activation status of each of the wireless communication components. Wherein, the status switching region can, for example, indicate the activation status of the wireless communication component by a brightening or a darkening approach. Moreover, the status switching module 430 further switches the activation status of the wireless communication component corresponding to the status switching region according to the selection operation performed on the status switching region by the user.

The function executing module 440 searches for the functions usable by each of the wireless communication components from all the wireless functions of the communication device according to the activation status of each of the wireless communication component, and displays the function icons of the functions in the status bar of each of the wireless communication components. Wherein, the function executing module 440, for example, determines the wireless communication component that each of the searched functions corresponds to according to a priority order of the activated wireless communication components, and displays each of the function icons of the functions in the status bar of the corresponding wireless communication component. The priority order is determined according to a communication charge rate, a communication quality or a transmission rate of each of the wireless communication components.

Moreover, the function executing module 440 further executes the function corresponding to the selected function icon according to the selection operation performed on the function icon by the user. When the function is executed, the function executing module 440 can record a use frequency of the function, and rearranges the function icons of the functions according to the use frequency.

It should be noted herein that the function executing module 440 further cooperates with the status switching module 430 to adjust the content of the displayed function icons. In detail, when the status switching module 430 switches the activation status of the wireless communication component, the function executing module 440 re-determines the wireless communication component that each of the searched functions corresponds to according to the priority order of the activated wireless communication components, and displays each of the function icons of the functions in the status bar of the corresponding wireless communication component. Regarding the deactivated wireless communication component, the function executing module 440, for example, displays the function icons of the functions of the wireless communication component by the hiding or darkening approach.

Moreover, regarding the function required to be implemented by two or more wireless communication components, the function executing module 440 first determines whether the required wireless communication components are activated, and displays the function icon of the function only when all of the required wireless communication components are activated, and such function icon can be displayed in the status bar of one of the wireless communication components only.

The signal strength display module 450 detects a signal strength of each of the wireless communication components, and displays the signal strength in the corresponding status bar.

Based on the user interface apparatus, the communication device can display the operation states of all of the wireless communication components in one frame to facilitate user browsing, and can simultaneously display the functions of the wireless communication components to facilitate selection by the user.

In summary, according to the method and the user interface apparatus for managing the functions of the wireless communication components, a management interface of the functions of the wireless communication components is established in allusion to the wireless communication components of the communication device, wherein besides the activation status of each of the wireless communication components is displayed, the functions supported by each of the wireless communication components are also displayed. By such means, the user can know the operation states of all of the wireless communication components from the management interface, and can easily activate or deactivate the wireless communication components, or execute functions of the wireless communication components, so that a more intuitive user interface is provided for the user to operate the communication device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing functions of wireless communication components, adapted to manage at least one function of a plurality of the wireless communication components in a communication device, the method comprising:
   respectively displaying a status bar representing each of the wireless communication components, and arranging the status bars to form a management interface, wherein each of the status bars corresponds to a status switching region and comprises a plurality of function icons of the functions of the corresponding wireless communication component, wherein the status switching region and the function icons are displayed within each of the status bars at the same time;
   detecting a selection operation performed by a user;
   when the selection operation is selecting one of the status switching regions,
      switching an activation status of the wireless communication component corresponding to the selected status switching region;
      searching for the functions of the activated wireless communication components according to the activation status of each of the wireless communication components;
      re-determining the wireless communication component that each of the searched functions corresponds to according to a priority order of the activated wireless communication components; and
      displaying the function icons of the functions in the status bar of the corresponding wireless communication component; and
   when the selection operation is selecting one of the function icons, executing the function corresponding to the selected function icon.

2. The method for managing the functions of the wireless communication components as claimed in claim 1, wherein before the step of respectively displaying the status bar representing each of the wireless communication components, the method further comprises:
   receiving an activation operation performed by the user to initiate the management interface; and
   detecting the activation status of each of the wireless communication components.

3. The method for managing the functions of the wireless communication components as claimed in claim 1, wherein the step of respectively displaying the status bar representing each of the wireless communication components comprises:
   indicating the activation status of each of the wireless communication components in the corresponding status switching region or the corresponding status bar.

4. The method for managing the functions of the wireless communication components as claimed in claim 1, wherein the step of respectively displaying the status bar representing each of the wireless communication components comprises:
   according to the activation status of each of the wireless communication components, searching for the functions of the activated wireless communication components; and
   displaying the function icons of the searched functions in the status bars of the corresponding wireless communication components.

5. The method for managing the functions of the wireless communication components as claimed in claim 4, wherein the step of respectively displaying the status bar representing each of the wireless communication components further comprises:
   determining the wireless communication component that each of the searched functions corresponds to according to the priority order of the activated wireless communication components; and
   displaying the function icons of the functions in the status bar of the corresponding wireless communication component.

6. The method for managing the functions of the wireless communication components as claimed in claim 5, wherein the priority order is determined according to a communication charge rate, a communication quality or a transmission rate of each of the wireless communication components.

7. The method for managing the functions of the wireless communication components as claimed in claim 1, wherein the step of respectively displaying the status bar representing each of the wireless communication components further comprises:
   determining whether the wireless communication components required for executing one of the functions are activated; and
   displaying the function icon of the function in the status bar of one of the wireless communication components only when the required wireless communication components are all activated.

8. The method for managing the functions of the wireless communication components as claimed in claim 1, wherein the step of respectively displaying the status bar representing each of the wireless communication components comprises:
   hiding or darkening the function icons of the functions of the wireless communication components that are not activated.

9. The method for managing the functions of the wireless communication components as claimed in claim 1, wherein the step of respectively displaying the status bar representing each of the wireless communication components comprises:
   sequentially arranging the function icons of the functions in the corresponding status bar according to a use frequency of the functions.

10. The method for managing the functions of the wireless communication components as claimed in claim 1, wherein the step of respectively displaying the status bar representing each of the wireless communication components comprises:
    displaying a signal strength of each of the wireless communication components in the corresponding status bar.

11. The method for managing the functions of the wireless communication components as claimed in claim 1, wherein the wireless communication components are a global positioning system (GPS) component, a global system for mobile communication (GSM) component, a personal handy-phone system (PHS) component, a code division multiple access (CDMA) component, a wireless fidelity (Wi-Fi) system component or a bluetooth component.

12. The method for managing the functions of the wireless communication components as claimed in claim 1, wherein the status switching region is a screen button or an icon displayed in the corresponding status bar, or the status switching region corresponds to a hardware button equipped on the communication device.

13. A user interface apparatus for managing functions of wireless communication components, adapted to a communication device comprising a plurality of wireless communication components, comprising:

an input unit, for allowing a user to input a selection operation;

a status bar module, for respectively displaying a status bar representing each of the wireless communication components, and arranging the status bars to form a management interface;

a status switching module, for corresponding to a status switching region of each of the wireless communication components and, when the selection operation is selecting one of the status switching regions, switching an activation status of the wireless communication component corresponding to the selected status switching region; and a function executing module, for displaying a function icon of at least one function of each of the wireless communication components in the corresponding status bar, wherein the status switching region and the function icons are displayed within each of the status bars at the same time and, when the selection operation is selecting one of the function icons, executing the function corresponding to the selected function icon, wherein when the status switching module switches the activation status of the wireless communication component corresponding to the selected status switching region, the function executing module searches for the functions of the activated wireless communication component according to the activation status of each of the wireless communication components, determines the wireless communication component that each of the searched functions corresponds to according to a priority order of the activated wireless communication components, and displays the function icons of the functions in the status bar of the corresponding wireless communication component.

14. The user interface apparatus for managing the functions of the wireless communication components as claimed in claim 13, wherein the status switching module indicates the activation status of each of the wireless communication components in the corresponding status switching region or the corresponding status bar.

15. The user interface apparatus for managing the functions of the wireless communication components as claimed in claim 13, wherein the function executing module searches for the functions of each of the activated wireless communication components according to the activation status of each of the wireless communication components, and displays the function icons of the functions in the corresponding status bar.

16. The user interface apparatus for managing the functions of the wireless communication components as claimed in claim 15, wherein the function executing module determines the wireless communication component that each of the searched functions corresponds to according to the priority order of the activated wireless communication components, and displays the function icons of the functions in the status bar of the corresponding wireless communication component.

17. The user interface apparatus for managing the functions of the wireless communication components as claimed in claim 16, wherein the priority order is determined according to a communication charge rate, a communication quality or a transmission rate of each of the wireless communication components.

18. The user interface apparatus for managing the functions of the wireless communication components as claimed in claim 13, wherein the function executing module further determines whether the wireless communication components required for executing one of the functions are activated, and displays the function icon of the function in the status bar of one of the wireless communication components only when the required wireless communication components are all activated.

19. The user interface apparatus for managing the functions of the wireless communication components as claimed in claim 13, wherein the function executing module further hides or darkens the function icons of the functions of the wireless communication components that are not activated.

20. The user interface apparatus for managing the functions of the wireless communication components as claimed in claim 13, wherein the function executing module further sequentially arranges the function icons of the functions in the corresponding status bar according to a use frequency of the functions.

21. The user interface apparatus for managing the functions of the wireless communication components as claimed in claim 13, further comprising:

a signal strength display module, for displaying a signal strength of each of the wireless communication components in the corresponding status bar.

22. The user interface apparatus for managing the functions of the wireless communication components as claimed in claim 13, wherein the wireless communication components are a GPS component, a GSM component, a PHS component, a CDMA component, a Wi-Fi system component or a bluetooth component.

23. The user interface apparatus for managing the functions of the wireless communication components as claimed in claim 13, wherein the input unit is a touch screen, a touch panel, a keyboard or a mouse.

24. The user interface apparatus for managing the functions of the wireless communication components as claimed in claim 13, wherein the status switching region is a screen button or an icon displayed in the corresponding status bar, or the status switching region corresponds to a hardware button equipped on the communication device.

* * * * *